United States Patent
Jiao et al.

(10) Patent No.: US 11,405,545 B2
(45) Date of Patent: Aug. 2, 2022

(54) STORAGE APPARATUS, MOBILE TERMINAL AND IMAGE PROCESSING METHOD THEREOF

(71) Applicant: JRD Communication (Shenzhen) LTD., Shenzhen (CN)

(72) Inventors: Tao Jiao, Shenzhen (CN); Jundong Zhou, Shenzhen (CN); Jinling Liu, Shenzhen (CN); Haiping Zhang, Shenzhen (CN); Li Tan, Shenzhen (CN); Jin Xia, Shenzhen (CN); Xuhui Wang, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 321 days.

(21) Appl. No.: 16/615,413

(22) PCT Filed: May 23, 2018

(86) PCT No.: PCT/CN2018/087981
§ 371 (c)(1),
(2) Date: Nov. 21, 2019

(87) PCT Pub. No.: WO2018/214900
PCT Pub. Date: Nov. 29, 2018

(65) Prior Publication Data
US 2020/0177799 A1 Jun. 4, 2020

(30) Foreign Application Priority Data
May 23, 2017 (CN) .......................... 201710367108.8

(51) Int. Cl.
*H04N 5/232* (2006.01)
*G06F 16/55* (2019.01)
*G06F 16/51* (2019.01)

(52) U.S. Cl.
CPC ......... *H04N 5/23222* (2013.01); *G06F 16/51* (2019.01); *G06F 16/55* (2019.01); *H04N 5/23216* (2013.01)

(58) Field of Classification Search
None
See application file for complete search history.

(56) References Cited

U.S. PATENT DOCUMENTS 5,819,288 A * 10/1998 De Bonet ............ G06K 9/4652
10,348,792 B2 7/2019 Zuckerberg et al.
(Continued)

FOREIGN PATENT DOCUMENTS

CN 102857697 1/2013
CN 103079047 5/2013
(Continued)

*Primary Examiner* — Mark T Monk

(57) ABSTRACT

Disclosed are a storage apparatus, a mobile terminal and an image processing method thereof. The image processing method comprises the following steps: acquiring a feature index parameter of each image; acquiring an operation instruction, and classifying images according to the operation instruction; determining, according to the classification of the images, whether a user is satisfied with an image; and if it is determined that the user is satisfied with the image, correcting a photographing parameter of a camera of a mobile terminal according to a feature index parameter of the satisfactory image, such that an image photographed thereby better conforms to the requirements of the user. Therefore, the present invention can directly obtain an image that a user is satisfied with, thereby saving on the screening time for a user, and thus improving the user experience.

12 Claims, 2 Drawing Sheets

(56) References Cited

U.S. PATENT DOCUMENTS

2008/0040673 A1    2/2008   Zuckerberg et al.
2017/0064198 A1    3/2017   Chen et al.
2017/0163878 A1    6/2017   Jiang et al.

FOREIGN PATENT DOCUMENTS

| CN | 103338329 | 10/2013 |
| CN | 104683697 | 6/2015 |
| CN | 104853092 | 8/2015 |
| CN | 104853102 | 8/2015 |
| CN | 105120167 | 12/2015 |
| CN | 105608700 | 5/2016 |
| CN | 105872350 | 8/2016 |
| CN | 106600524 | 4/2017 |
| CN | 107277228 | 10/2017 |
| JP | 2010-500648 | 1/2010 |
| JP | 2010-171661 | 8/2010 |
| WO | WO 2018/214900 | 11/2018 |

\* cited by examiner

STORAGE APPARATUS, MOBILE TERMINAL AND IMAGE PROCESSING METHOD THEREOF

RELATED APPLICATIONS

This application is a National Phase of PCT Patent Application No. PCT/CN2018/087981 having International filing date of May 23, 2018, which claims the benefit of priority of Chinese Patent Application No. 201710367108.8 filed on May 23, 2017. The contents of the above applications are all incorporated by reference as if fully set forth herein in their entirety.

FIELD AND BACKGROUND OF THE INVENTION

The present invention relates to an image processing method, and more particularly to a storage device, a mobile terminal, and an image processing method.

A smart mobile terminal, such as a smart phone, makes it easy for a user to record their life. For example, the users could use smart phones to take pictures and store the pictures. Sometimes when the user takes multiple pictures and would like to store or share those he is satisfied with, the user needs to select some of the pictures from hundreds of pictures, open related editing software to edit those selected pictures, and then share the edited pictures. This process takes a lot of time especially when the user needs to share these pictures immediately. Therefore, the user experience is ruined.

SUMMARY OF THE INVENTION

The technical issue that a preferred embodiment of the present invention solves is to provide a storage device, a mobile terminal and a related image processing method, which allow the user to get satisfying images, save the user's time to select images such that the user experience could be improved.

According to an embodiment of the present invention, a storage device storing program instructions executable by a processor to perform operations of: obtaining a characteristic indication parameter of each of images; obtaining an operation instruction and classifying the images according to the operation instruction; determining whether a user satisfies with the images according to classifications of the images; and if determining that the user satisfies with the images, then adjusting an imaging parameter of a camera of the mobile terminal according to the characteristic indication parameters of the images such that the camera is capable of generating images that meet the user's demands. The program instructions is executable by the processor to further perform an operation of: adjusting the imaging parameter for multiple times until a ratio of the satisfying images to the unsatisfying images is larger than or equal to a predetermined threshold, or adjusting the imaging parameter for multiple times until a lifetime of the mobile terminal is larger than or equal to a predetermined time threshold.

According to another embodiment of the present invention, an image processing method of a mobile terminal is disclosed. The image processing method comprises: obtaining a characteristic indication parameter of each of images; obtaining an operation instruction and classifying the images according to the operation instruction; determining whether a user satisfies with the images according to classifications of the images; and if determining that the user satisfies with the images, then adjusting an imaging parameter of a camera of the mobile terminal according to the characteristic indication parameters of the images such that the camera is capable of generating images that meet the user's demands.

According to another embodiment of the present invention, a mobile terminal is disclosed. The mobile terminal comprises: a camera, a storage device configured to storing a program, and a processor configured to execute the program instructions to perform operations of: obtaining a characteristic indication parameter of each of images; obtaining an operation instruction and classifying the images according to the operation instruction; determining whether a user satisfies with the images according to classifications of the images; and if determining that the user satisfies with the images, then adjusting an imaging parameter of a camera of the mobile terminal according to the characteristic indication parameters of the images such that the camera is capable of generating images that meet the user's demands.

In contrast to the prior art, the present invention provides a storage device, a mobile terminal and an image processing method. The image processing method comprises: obtaining a characteristic indication parameter of each of images; obtaining an operation instruction and classifying the images according to the operation instruction; determining whether a user satisfies with the images according to classifications of the images; and if determining that the user satisfies with the images, then adjusting an imaging parameter of a camera of the mobile terminal according to the characteristic indication parameters of the images such that the camera is capable of generating images that meet the user's demands. Therefore, the present invention could learn from the user's operations on the images and adjust the imaging parameter of the camera accordingly. In this way, the present invention could save the user time to delete those unsatisfying images and further improve the user experience.

DESCRIPTION OF SPECIFIC EMBODIMENTS OF THE INVENTION

Figure 1:
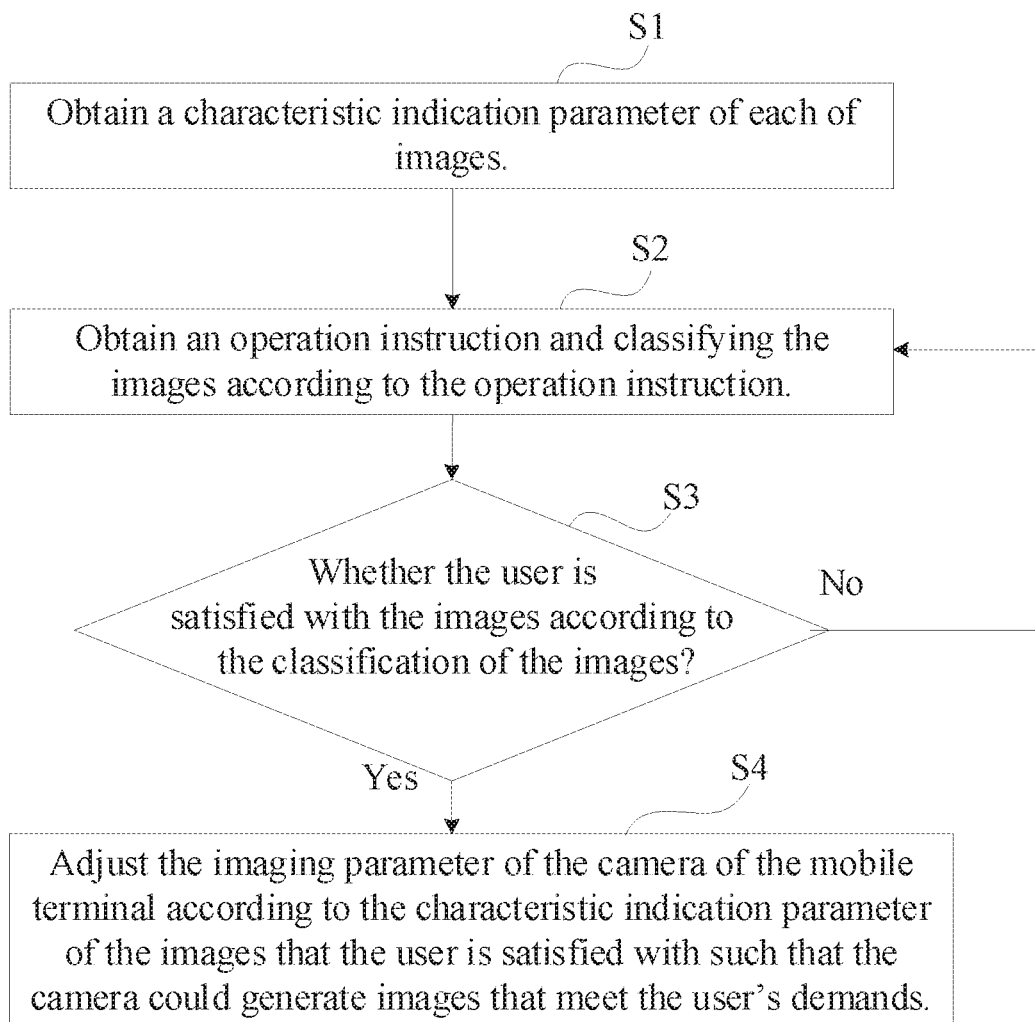
FIG. 1 is a flow chart showing an image processing method of a mobile terminal according to an embodiment of the present invention.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined. In the disclosure, it is should be understood that spatially relative terms, such as "above", "below", "front", "back", "left", "right", "top", "bottom", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The spatially relative terms are not limited to specific orientations depicted in the figures.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

Specifically, the terminologies in the embodiments of the present invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

Please refer to FIG. 1. FIG. 1 is a flow chart showing an image processing method of a mobile terminal according to an embodiment of the present invention. The image processing method comprises following steps:

Step S1: obtain a characteristic indication parameter of each of images. Here, the images could comprise pictures and videos.

The characteristic indication parameter of the image could comprise a peak signal-to-noise ratio (PSNR (dB)), a dynamic range, a resolution, a color accuracy, and an auto white balance error (AWB error). The characteristic indication parameter is listed in table 1.

TABLE 1

| characteristic indication parameter of the image: | | |
|---|---|---|
| Parameter | Specified Value | Results |
| PSNR(dB) | Low Light - 20 lux | >25 dB - 10 lux |
| | Daylight - 500 lu | 40 dB |
| Dynamic range | Low Light - 20 lux | >180 |
| | High Daylight - 500 lux | >200 |
| SMIA TV distortion | | <1% |
| Shading | Corner worst | >75% |
| | Sides worst | >75% |
| Color Shading | R/G Max | <1.1 |
| | R/G Min | >0.9 |
| | R/B Max | <1.1 |
| | R/B Min) | >0.9 |

TABLE 1-continued

| characteristic indication parameter of the image: | | |
|---|---|---|
| Parameter | Specified Value | Results |
| Resolution (30 cm screen) | Horizontal | >1200 |
| | Vertical | >1200 |
| | Slanted45 | >1100 |
| | Corners 0.7D | >1000 |
| Resolution (75 cm screen) | Horizontal | >1200 |
| | Vertical | >1200 |
| | Slanted45 | >1100 |
| | Corners 0.7D | >1000 |
| AWB error | Daylight | <0.1 |
| | Cool White | <0.1 |
| | A | <0.15 |
| | TL84 | <0.15 |
| | Low Light- 0 lux | <0.2 |
| Color accuracy (Daylight) | ΔC_mean (DeltaC_mean) | <10 |
| | ΔE_mean (DeltaE_mean) | <13 |
| | Saturation | 100~120% |
| Color accuracy (CoolWhite) | ΔC_mean (DeltaC_mean) | <10 |
| | ΔE_mean (DeltaE_mean) | <13 |
| | Saturation | 100~120% |
| Color accuracy (Horizon) | ΔC_mean (DeltaC_mean) | <12 |
| | ΔE_mean (DeltaE_mean) | <15 |
| | Saturation | 90~120% |
| Color accuracy ("A") | ΔC_mean (DeltaC_mean) | <12 |
| | ΔE_mean (DeltaE_mean) | <15 |
| | Saturation | 90~120% |
| Color accuracy (TL84) | ΔC_mean (DeltaC_mean) | <12 |
| | ΔE_mean (DeltaE_mean) | <15 |
| | Saturation | 90~120% |
| Color accuracy (Low Light - 20 lux) | ΔC_mean (DeltaC_mean) | <18 |
| | ΔE_mean (DeltaE_mean) | <24 |
| | Saturation | 80~120% |

In this step, the characteristic indication parameter could be stored in the mobile terminal or uploaded to the cloud server.

Step S2: obtain an operation instruction and classifying the images according to the operation instruction. Here, the operation instruction comprises uploading the images to the social network, such as Wechat, qq, Facebook, Twitter and etc, or some other operations of labeling an image as a satisfying image or an unsatisfying image. It should be understood that all operations related to the images could be regarded as operation instructions. There is no specific limitation on the definition of the operation instruction.

In this embodiment, the images are classified into uploaded images, deleted images, and labeled as satisfying images or unsatisfying images. In addition, a visiting time that the user accesses the images could be further used to classify the images. Moreover, the present invention could further collect how many times the user had accessed the images and uses the information to classify the images. Further, the present invention could classify the images according to the visiting time and how many time the user accessed the images.

Step S3: determine whether the user is satisfied with the images according to the classification of the images.

If the images are uploaded or already labeled as satisfying images, then the present invention determines that the user is satisfied with the images. If the images are deleted or already labeled as unsatisfying images, then the present invention determines that the user is not satisfied with the images.

In addition, if the images were recently visited during a predetermined time period by the user, or the visiting times are more than or equal to a predetermined threshold, or the images were visited for more than or equal to a predetermined times during a predetermined time period, then the present invention determines that the user is satisfied with the images. On the contrary, if the user did not visit the images during a predetermined time period, or the visiting times are less than to a predetermined threshold, or the images were visited for less than a predetermined times during a predetermined time period, then the present invention determines that the user is unsatisfied with the images.

Step S4: adjust the imaging parameter of the camera of the mobile terminal according to the characteristic indication parameter of the images that the user is satisfied with such that the camera could generate images that meet the user's demands.

In this embodiment, the present invention could set the imaging parameter of the camera to be the same as or close to the characteristic indication parameter of the images that the user is satisfied with.

In another embodiment, the present invention could further adjust the imaging parameter of the camera according to the characteristic indication parameters of the images that the user is unsatisfied with. That is, the present invention can set the imaging parameter of the camera to be different or far away from the characteristic indication parameter of the images that the user is unsatisfied with.

For example, assume there is an image having the following characteristic indication parameter comprises: PSNR (DB)=45; dynamic range=210; resolution=22; color accuracy=10; AWB error=0.5. The user does not upload this image to the social network, hardly visits this image and finally deletes it. The present invention determines that the user is unsatisfied with this image accordingly and the above-mentioned characteristic indication parameter could be regarded as not complying with the user's demands. Then, the present invention utilizes this characteristic indication parameter to actively adjust the imaging parameter of the camera.

In order to raise the accuracy of adjusting the imaging parameter, the present invention adjusts the imaging parameter for multiple times until the ratio of the satisfying images to the unsatisfied images is larger than or equal to a predetermined threshold or until the lifetime of the mobile terminal is larger than a predetermined threshold. For example, the predetermined threshold for the ratio of the satisfying images to the unsatisfied images could be set as four and the predetermined threshold for the lifetime of the mobile terminal could be set as 12 months.

The user may continuously take new images. Therefore, the mobile terminal could continuously adjust the imaging parameter of the camera accordingly. In this way, as time goes by, a big amount of images are analyzed and the imaging parameter of the camera is adjusted to meet the user's demand more. Thus, in the end, the user could use the mobile terminal to generate satisfying images without deleting unwanted images and thus the user experience is improved.

The present invention further provides a mobile terminal for performing the aforementioned image processing method.

Figure 2:
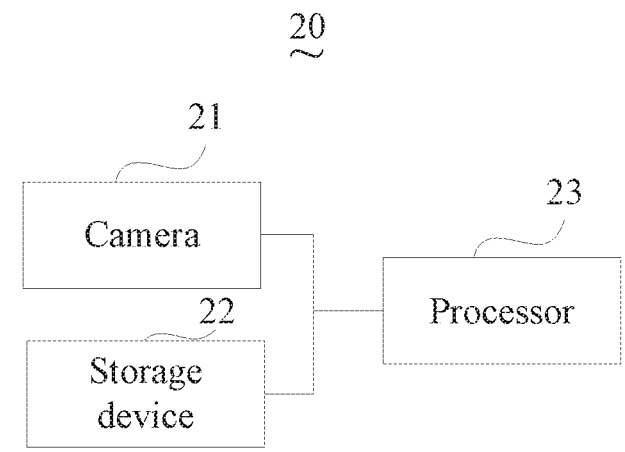
FIG. 2 is a diagram showing a structure of a mobile terminal according to an embodiment of the present invention.

Please refer to FIG. 2. FIG. 2 is a diagram showing a structure of a mobile terminal according to an embodiment of the present invention. The mobile terminal 20 comprises a camera 21, a storage device 22 and a processor 23. The storage device 22 is configured to store a program. The processor 23 could execute the program instructions to perform the following steps: obtaining a characteristic indication parameter of each of images; obtaining an operation instruction and classifying the images according to the operation instruction; determining whether a user satisfies with the images according to classifications of the images; and if determining that the user satisfies with the images, then adjusting an imaging parameter of a camera of the mobile terminal according to the characteristic indication parameters of the images such that the camera is capable of generating images that meet the user's demands.

The characteristic indication parameter of the images comprises a PSNR, a dynamic range, a resolution, a color accuracy, and an AWB error. The details had been illustrated in the above and thus omitted here.

In this embodiment, the processor 23 further stores the characteristic indication parameter of the images in the mobile terminal or updates the characteristic indication parameter of the images to the cloud server.

In this embodiment, the operation instruction comprises uploading the images to the social network, such as Wechat, qq, Facebook, Twitter and etc, or some other operations of labeling an image as a satisfying image or an unsatisfying image. It should be understood that all operations related to the images could be regarded as operation instructions. There is no specific limitation on the definition of the operation instruction.

The processor 23 classifies the images into uploaded images, deleted images, and labeled as satisfying images or unsatisfying images.

If the images are uploaded or already labeled as satisfying images, then the processor 23 determines that the user is satisfied with the images. If the images are deleted or already labeled as unsatisfying images, then the processor 23 determines that the user is not satisfied with the images.

The processor 23 could further obtain the time when the user visit the images and classify the images according to the visiting time. Or, the processor 23 could obtain how many times that the user had accessed the images and uses the information to classify the images. Further, the processor 23 could classify the images according to the visiting time and how many time the user accessed the images.

In addition, if the images were recently visited during a predetermined time period by the user, or the visiting times are more than or equal to a predetermined threshold, or the images were visited for more than or equal to a predetermined times during a predetermined time period, then the processor 23 determines that the user is satisfied with the images. On the contrary, if the user did not visit the images during a predetermined time period, or the visiting times are less than to a predetermined threshold, or the images were visited for less than a predetermined times during a predetermined time period, then the processor 23 determines that the user is unsatisfied with the images.

After determining whether the images are satisfying images or unsatisfying images, the imaging parameter of the camera of the mobile terminal could be adjusted according to the characteristic indication parameter accordingly. The detailed operation had been illustrated in the above and thus omitted here.

In order to raise the accuracy of adjusting the imaging parameter, the present invention adjusts the imaging parameter for multiple times until the ratio of the satisfying images to the unsatisfied images is larger than or equal to a predetermined threshold or until the lifetime of the mobile terminal is larger than a predetermined threshold. The detailed operation had been illustrated in the above and thus omitted here.

Figure 3:
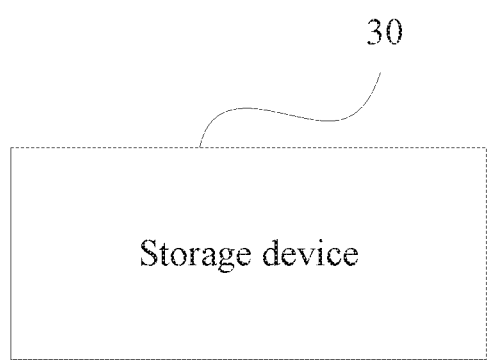
FIG. 3 is diagram showing a structure of a storage device according to an embodiment of the present invention.

The present invention further provides a storage device shown in FIG. 3. The storage device 30 is configured to store a program, which can be executed to perform the aforementioned image processing method.

In contrast to the prior art, the present invention could allow the user to take desired images without deleting/selecting images. This saves the user's time and improves the user experience.

Above are embodiments of the present invention, which does not limit the scope of the present invention. Any modifications, equivalent replacements or improvements within the spirit and principles of the embodiment described above should be covered by the protected scope of the invention.

What is claimed is:

1. A non-transitory storage device storing program instructions executable by a processor to perform operations of:
   obtaining a characteristic indication parameter of each of images;
   obtaining an operation instruction and classifying the images according to the operation instruction;
   determining whether a user satisfies with the images according to classifications of the images;
   if determining that the user satisfies with the images, then adjusting, according to the characteristic indication parameters of the images, an imaging parameter of a camera of the mobile terminal for multiple times until a ratio of the satisfying images to the unsatisfying images is larger than or equal to a predetermined threshold, such that the camera is capable of generating images that meet the user's demands.

2. The storage device of claim 1, wherein the characteristic indication parameter comprises a peak signal-to-noise ratio (PSNR), a dynamic range, a resolution, a color accuracy, and an auto white balance error (AWB error).

3. The storage device of claim 1, wherein the program instructions is executable by the processor to further perform operations of:
   classifying the image into uploaded images, deleted images, satisfying images or unsatisfying images according to the operation instruction;
   determining that the user satisfies with the images if the images are classified as the uploaded images or the satisfying images; and
   determining that the user does not satisfy with the images if the images are classified as the deleted images or the unsatisfying images.

4. The storage device of claim 1, wherein the program instructions are executable by the processor to perform an operation of: storing the characteristic indication parameter in the storage device or updating the characteristic indication parameter to a cloud server.

5. An image processing method of a mobile terminal, comprising:
   obtaining a characteristic indication parameter of each of images;
   obtaining an operation instruction and classifying the images according to the operation instruction;
   determining whether a user satisfies with the images according to classifications of the images; and
   if determining that the user satisfies with the images, then adjusting, according to the characteristic indication parameters of the images, an imaging parameter of a camera of the mobile terminal for multiple times until a ratio of the satisfying images to the unsatisfying images is larger than or equal to a predetermined threshold, such that the camera is capable of generating images that meet the user's demands.

6. The image processing method of claim 5, wherein the characteristic indication parameter comprises a peak signal-to-noise ratio (PSNR), a dynamic range, a resolution, a color accuracy, and an auto white balance error (AWB error).

7. The image processing method of claim 5, wherein the step of classifying the images according to the operation instruction comprises:
   classifying the image into uploaded images, deleted images, satisfying images or unsatisfying images according to the operation instruction;
   and the step of determining whether the user satisfies with the images according to classifications of the images comprises:
   determining that the user satisfies with the images if the images are classified as the uploaded images or the satisfying images; and
   determining that the user does not satisfy with the images if the images are classified as the deleted images or the unsatisfying images.

8. The image processing method of claim 5, further comprising:
   storing the characteristic indication parameter in the storage device; or updating the characteristic indication parameter to a cloud server.

9. A mobile terminal, comprising:
   a camera;
   a storage device, configured to storing program instructions; and
   a processor, configured to execute the program instructions to perform operations of:
   obtaining a characteristic indication parameter of each of images;
   obtaining an operation instruction and classifying the images according to the operation instruction;
   determining whether a user satisfies with the images according to classifications of the images; and
   if determining that the user satisfies with the images, then adjusting, according to the characteristic indication parameters of the images, an imaging parameter of a camera of the mobile terminal for multiple times until a ratio of the satisfying images to the unsatisfying images is larger than or equal to a predetermined threshold, such that the camera is capable of generating images that meet the user's demands.

10. The mobile terminal of claim 9, wherein the characteristic indication parameter comprises a peak signal-to-noise ratio (PSNR), a dynamic range, a resolution, a color accuracy, and an auto white balance error (AWB error).

11. The mobile terminal of claim 9, wherein the processor is further configured to execute the program instructions to perform operations of:
   classifying the image into uploaded images, deleted images, satisfying images or unsatisfying images according to the operation instruction;
   determining that the user satisfies with the images if the images are classified as the uploaded images or the satisfying images; and determining that the user does not satisfy with the images if the images are classified as the deleted images or the unsatisfying images.

12. The mobile terminal of claim 9, wherein the processor is configured to execute the program instructions to perform an operation of: storing the characteristic indication parameter in the storage device or updating the characteristic indication parameter to a cloud server.

* * * * *